(12) United States Patent  (10) Patent No.: US 9,098,412 B1
Marchant et al.  (45) Date of Patent: Aug. 4, 2015

(54) GUIDED PERFORMANCE TROUBLESHOOTING AND EXPLORATION

(71) Applicants: Kendra Marchant, Arlington, MA (US); Natalie Lee Chin Wong, Brookline, MA (US); Rhon Porter, South Grafton, MA (US); Bruce R. Rabe, Dedham, MA (US)

(72) Inventors: Kendra Marchant, Arlington, MA (US); Natalie Lee Chin Wong, Brookline, MA (US); Rhon Porter, South Grafton, MA (US); Bruce R. Rabe, Dedham, MA (US)

(73) Assignee: EMC Corporation, Hopkinton, MA (US)

( * ) Notice: Subject to any disclaimer, the term of this patent is extended or adjusted under 35 U.S.C. 154(b) by 186 days.

(21) Appl. No.: 13/716,373

(22) Filed: Dec. 17, 2012

(51) Int. Cl.
  *G06F 11/00* (2006.01)
  *G06F 11/07* (2006.01)
  *G06F 11/22* (2006.01)

(52) U.S. Cl.
  CPC .......... *G06F 11/079* (2013.01); *G06F 11/0793* (2013.01); *G06F 11/2257* (2013.01)

(58) Field of Classification Search
  CPC ............ G06F 11/0727; G06F 11/0766; G06F 11/0793; G06F 11/2257; G06F 11/3003; G06F 11/3034; G06F 11/32; G06F 11/321; G06F 11/324; G06F 11/327; G06F 11/328; G06F 11/079
  USPC ............ 714/46, 25, 26, 42, 47.1, 47.2, 48, 57
  See application file for complete search history.

(56) References Cited

U.S. PATENT DOCUMENTS

| | | | |
|---|---|---|---|
| 7,743,332 B2 * | 6/2010 | Clark et al. .................... | 715/736 |
| 2006/0168475 A1 * | 7/2006 | Segers et al. .................... | 714/25 |
| 2008/0262890 A1 * | 10/2008 | Korupolu et al. ................. | 705/8 |
| 2009/0106603 A1 * | 4/2009 | Dilman et al. .................. | 714/42 |

* cited by examiner

*Primary Examiner* — Joseph D Manoskey
(74) *Attorney, Agent, or Firm* — Muirhead and Saturnelli, LLC

(57) ABSTRACT

Described are techniques for problem analysis. Notification is provided through a user interface regarding a performance problem of a system. A plurality of user interface displays are then displayed which correspond to a plurality of steps in connection with performing analysis of the performance problem. Each of the user interface displays includes a predefined set of one or more options. At least a first of the options in the predefined set corresponds to a recommended action automatically performed in response to selecting said first option of the predefined set.

19 Claims, 13 Drawing Sheets

| KPI Group | List of KPIs in the group | List of categories by which the KPIs can be broken by (applies to all KPIs in the group, unless noted otherwise) |
|---|---|---|
| CPU: This is based on CPU statistics for each of the storage processors | CPU: The total processing cycles (in percentage) across all the storage processors utilized by the storage system. (e.g., CPU utilization %) | Storage Processor: The storage processors present in the system (e.g., SPA, SPB). |
| Network port: These are based on statistics available on the physical ports | Network Bandwidth: The total IO traffic (in MB/second) handled across all storage ports.<br>Network IOPS (e.g., network I/O processing rate or throughput: The total number of IOs (in IO/second) handled across all storage ports. | Storage Processor: The storage processor that processed the port traffic.<br>Port Type (e.g., Ethernet, FC): The type of port that handled the storage traffic. |
| LUN: These are based on the statics available at the LUN level | Application Response Time: The average time (in milliseconds) elapsed while completing application IO request.<br>Application Bandwidth: The total application related IO traffic (in MB/second) handled by the storage system.<br>Application IOPS (e.g., application I/O processing rate or throughput): The number of application IOs (in IO/second) handled by the storage system.<br>Application IO Size: The average size of an application IO request handled by the storage system.<br>Application Queue Length: The average number of application IO requests waiting to be serviced in the storage system queue. | Storage Processor: The storage processor that processed the network traffic (e.g., SPA, SPB).<br>Application: The application that generated the storage traffic.<br>Application Type: The type of application that generated the storage traffic (e.g., Exchange, Generic SCSI Storage, VMWare, Microsoft Hyper-V, Shared Folder).<br>Read/Write: Indicates whether the traffic was related to read or write operation.<br>Storage Pool: The storage pool that translated the network traffic to the physical layer.<br>Data Size (for Application IOPS only): The size of the requested data categorized across fixed set of buckets (512 bytes, 1KB, 2KB, 4KB, 8KB, 32KB, 64KB+).<br>Provisioning Type: The type of provisioning used for the storage being accessed (e.g., Thin, Thick).<br>Virtual Disk (LUN): The target LUN for the storage traffic. |

FIG. 9

| KPI Group | List of KPIs in the group | List of categories by which the KPIs can be broken by (applies to all KPIs in the group, unless noted otherwise) |
|---|---|---|
| Disk: These are based on the statistics available at the physical disk level | Disk IOPS (e.g., physical storage device I/O processing rate or throughput): The number of disk level IOs (in IO/second) handled by the storage system.<br>Disk Bandwidth (e.g., physical storage device level bandwidth or data processing rate): The total disk IO traffic (in MB/second) handled by the storage system.<br>Disk Errors: The number of disk errors encountered by the system. These may be total number within an elapsed time period.<br>Disk Service Time: The average time (in milliseconds) elapsed while completing a disk IO request (not including time spent in queue).<br>Disk Response Time: The average time (in milliseconds) elapsed while completing a disk IO request (including time spent in queue waiting).<br>Disk Queue Length: The average number of disk IO requests waiting to be serviced. This is based on the average busy queue length (ABQL) of the disk. | Tier: The storage tier against which the disk KPI was tracked (e.g., Flash, SAS, SATA FC 10K RPM, FC 15K RPM, etc.)<br>Storage Pool: The storage pool in which the disk KPI was tracked.<br>RAID Type: The RAID type for which the disk KPI was tracked (e.g., RAID10, RAID5, RAID6).<br>Disk: The target disk for the storage traffic.<br>Bus: Disk traffic broken down by the bus transporting it.<br>DAE: Disk traffic broken down by the Disk Array Enclosure containing the disk. |
| Protocol: These are based on protocol level statistics | Protocol Response Time: The average time (in milliseconds) elapsed while completing a Protocol IO request.<br>Protocol Bandwidth: The total Protocol related IO traffic (in MB/second) handled by the storage system (cannot be broken by Protocol version, Protocol operations or Data Size).<br>Protocol IOPS (e.g., protocol I/O processing rate or throughput): The number of Protocol IOs (in IO/second) handled by the storage system. | Protocol: The protocol (NFS, CIFS, iSCSI, FC) over which the data was transported.<br>Protocol version: The version of the protocol over which the data was transported.<br>Storage Processor: The storage processor that processed the network traffic.<br>Protocol Operations: Traffic broken down by specific protocol operations, including read, write, and metadata (not applicable for Bandwidth).<br>Data Size: The size of the requested data categorized across fixed set of buckets (e.g., 512 bytes, 1KB, 2KB, 4KB, 8KB, 32KB, 64KB, 64KB+). |

FIG. 10

| KPI Group | List of KPIs in the group | List of categories by which the KPIs can be broken by (applies to all KPIs in the group, unless noted otherwise) |
|---|---|---|
| NAS client: These are based on NAS correlated statistics at client level | Shared Folder Throughput: The number of Shared Folder IOs (in IO/sec) handled by the system.<br><br>Shared Folder Response Time: The average time (in milliseconds) that the Shared Folder server took to process IO requests.<br><br>Shared Folder Bandwidth: The total Shared Folder IO traffic (in MB/second) handled by system.<br><br>Shared Folder Average IO Size : The average size of a Shared Folder IO request handled by the storage system | Storage Processor: The storage processor that processed the shared folder traffic.<br><br>Read/Write: Indicates whether the shared folder traffic was related to read, write, or metadata operation.<br><br>Data Mover: The virtual data mover that handled the shared folder traffic.<br><br>Client: Identifies the client by IP address that contributed to the shared folder traffic |
| Cache: based on Cache-level statistics | Cache Hit: The percent of read requests that were fulfilled by retrieval from cache.<br>Cache Dirty : The portion of cache (in percentage) that has been written but not flushed to disk. | Cache Type: The type of cache against which the cache KPI was tracked (e.g., SP, FAST). |

FIG. 11

GUIDED PERFORMANCE TROUBLESHOOTING AND EXPLORATION

BACKGROUND

1. Technical Field

This application relates generally to techniques for facilitating problem analysis such as in connection with a problem of a computer system, storage system, and the like.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with a data storage system, computer system, or more generally, any system, problems may arise. An administrator or other user may perform problem analysis in an attempt to determine a cause and action to take to correct the problem. In connection with systems, such as data storage systems, problem analysis may be complex and require a sophisticated level of understanding of many aspects such as performance terminology, management, how to utilize and interpret information derived from any existing software tools and interfaces, and the like, in order to effectively and efficiently perform problem analysis. As a result, a customer or user not having the requisite knowledge and skill set may incur costs related to extensive and/or unnecessary downtime, payments for profession services to diagnose the problem cause, and the like.

SUMMARY OF THE INVENTION

In accordance with one aspect of the invention is a method of problem analysis comprising providing notification through a user interface regarding a performance problem of a system; and presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option of the predefined set. The recommended action automatically performed may include displaying first information resulting from automatically selecting one or more user interface elements identifying one or more criteria used to further filter or partition information included in a current user interface display. The step of presenting may include displaying a first of the plurality of user interface displays including a first predefined set of one or more options in connection with a first of the plurality of steps; selecting a first of the options in the first predefined set; and responsive to selecting the first option of the first predefined set, displaying a second of the plurality of user interface displays in connection with a second of the plurality of steps, where the second user interface display may include a second predefined set of one or more options and second information displayed as a result of selecting one or more user interface elements. Selecting one or more user interface elements may be performed automatically in connection with selecting the first option of the first set. If a second option of the first predefined set different from the first option of the first predefined set is selected, a user interface may be updated to include an interface display different from the second user interface display whereby the interface display may include a third predefined set of one or more options different than the second predefined set. The performance problem may be detected when one of a predefined set of performance indicators is not in accordance with a threshold associated with the one predefined performance indicator. The system may be a data storage system that receives data operations from one or more hosts having applications executing thereon which store data on the data storage system. The predefined set of performance indicators may include any one or more of: network latency, CPU utilization, network bandwidth, network I/O processing rate or throughput, application response time, application bandwidth, application I/O processing rate or throughput, application I/O size, application queue length, physical storage device I/O processing rate or throughput, physical storage device bandwidth or data processing rate, physical storage device service time, total physical storage device errors within an elapsed time period, physical storage device response time, disk queue length, protocol response time, protocol bandwidth, protocol I/O processing rate or throughput, shared folder throughput or I/O processing rate, shared folder response time, shared folder bandwidth, shared folder average I/O size, a portion of reads that are read hits thereby being serviced using data from cache rather than reading data from a physical device, and a portion of cache including a most current set of write data not yet destaged to physical storage. The plurality of steps for the performance problem may be included in a troubleshooting tree. The troubleshooting tree may include a plurality of levels, each of the plurality of levels including one or more nodes. The troubleshooting tree may include a first node corresponding to a first of the plurality of steps. A first set of one or more child nodes of the first node may correspond to a first predefined set of one or more options presented in a user interface display, and at least one of the options in the first predefined set may correspond to a recommended action automatically performed in response to selecting said one option. Each of the plurality of steps may correspond to a different one of the plurality of levels in the tree. The different one of the plurality of levels in the tree may include one or more nodes representing one or more predefined options from which a user is allowed to select from a user interface display in connection with performing each step of a guided user interface for analyzing the performance problem. The recommended action may include any of displaying a heat map, further filtering information currently displayed in a user interface display, and updating a current user interface display. Each of the plurality of user interface displays may include a first area in which the predefined set of one or more options are displayed and a second area. Responsive to selection of the first option from the predefined set, the recommended action may be automatically performed which includes automatically updating the second area of said each user interface display thereby producing an updated second area. The updated second area may include a display of information equivalent to having selected one or more user interface elements identifying criteria for filtering or partitioning information included in the second area thereby producing resulting information displayed in the updated second area.

In accordance with another aspect of the invention is a system comprising a data storage system including a plurality of physical storage devices; a set of one or more hosts, each of said one or more hosts having one or more applications executing thereon which store data on one or more of the physical storage devices of the data storage system; a computer readable medium including code stored thereon which, when executed, performs processing for problem analysis, the computer readable medium comprising code for: providing notification through a user interface regarding a performance problem of the data storage system; and presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option.

In accordance with another aspect of the invention is a computer readable medium comprising code stored thereon for problem analysis, the computer readable medium comprising code for: providing notification through a user interface regarding a performance problem of a system; and presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option of the predefined set. The recommended action automatically performed may include displaying first information resulting from automatically selecting one or more user interface elements identifying one or more criteria used to further filter or partition information included in a current user interface display. The presenting may include displaying a first of the plurality of user interface displays including a first predefined set of one or more options in connection with a first of the plurality of steps; selecting a first of the options in the first predefined set; and responsive to selecting the first option of the first predefined set, displaying a second of the plurality of user interface displays in connection with a second of the plurality of steps, said second user interface display including a second predefined set of one or more options and second information displayed as a result of selecting one or more user interface elements, wherein said selecting one or more user interface elements is performed automatically in connection with selecting the first option of the first set. If a second option of the first predefined set different from the first option of the first predefined set is selected, a user interface may be updated to include an interface display different from the second user interface display whereby the interface display may include a third predefined set of one or more options different than the second predefined set. The performance problem may be detected when one of a predefined set of performance indicators is not in accordance with a threshold associated with said one predefined performance indicator. The system may be a data storage system that receives data operations from one or more hosts having applications executing thereon which store data on the data storage system. The predefined set of performance indicators may include any one or more of: network latency, CPU utilization, network bandwidth, network I/O processing rate or throughput, application response time, application bandwidth, application I/O processing rate or throughput, application I/O size, application queue length, physical storage device I/O processing rate or throughput, physical storage device bandwidth or data processing rate, physical storage device service time, total physical storage device errors within an elapsed time period, physical storage device response time, disk queue length, protocol response time, protocol bandwidth, protocol I/O processing rate or throughput, shared folder throughput or I/O processing rate, shared folder response time, shared folder bandwidth, shared folder average I/O size, a portion of reads that are read hits thereby being serviced using data from cache rather than reading data from a physical device, and a portion of cache including a most current set of write data not yet destaged to physical storage.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9-11 are examples of KPIs (key performance indicators) or metrics and associated categories by which information associated with the metric may be further partitioned or filtered in an embodiment in accordance with techniques herein.

DETAILED DESCRIPTION OF EMBODIMENT(S)

Figure 1:
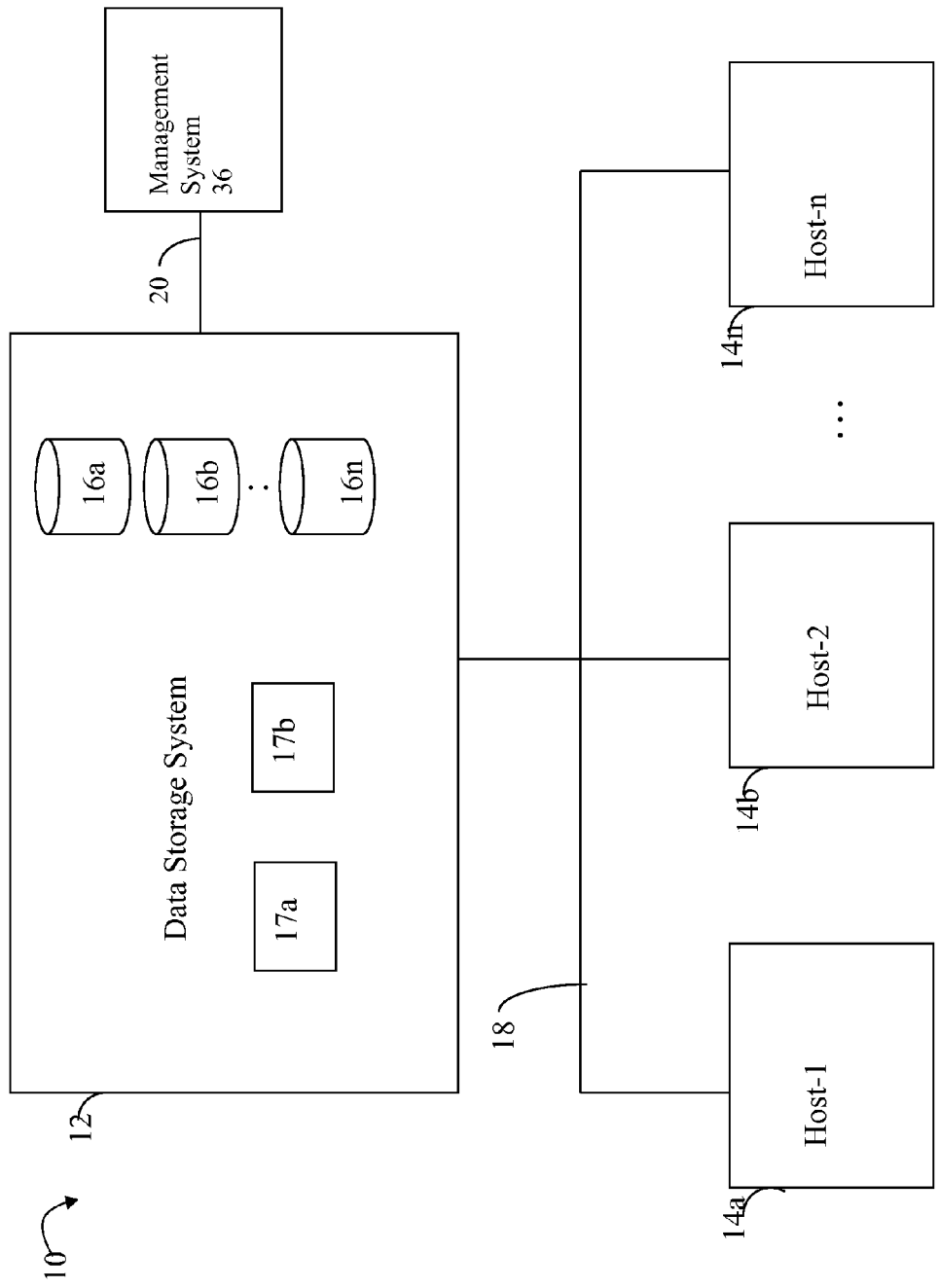
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. The system 10 also includes a management system 36 connected to one or more data storage systems 12 through communication medium 20. In this embodiment of the system 10, the hosts 14a-14n may access the data storage system 12 using communication medium 18, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10. In one embodiment, the communication medium 20 may be a LAN connection and the communication medium 18 may be an iSCSI or Fibre Channel connection.

Each of the host systems 14a-14n and the data storage system 12 included in the system 10 may be connected to the communication medium 18 by any one of a variety of connections as may be provided and supported in accordance with the type of communication medium 18. Similarly, the management system 36 may be connected to the communication medium 20 by any one of variety of connections in accordance with the type of communication medium 20. The processors included in the host computer systems 14a-14n and management system 36 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, management system 36, and data storage systems may all be located at the same physical site, or, alternatively, may also be located in different physical locations. Examples of the communication medium that may be used to provide the different types of connections between the host computer systems and the data storage system, and between the data storage system and the management system of the system 10 may use a variety of different communication protocols such as SCSI, Fibre Channel (FC), iSCSI, and the like. Some or all of the connections by which the hosts, management system, and data storage system may be connected to the communication mediums may pass through other communication devices, such as switching equipment, a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array, such as a VNX® data storage array by EMC Corporation of Hopkinton, Mass., including a plurality of data storage devices 16a-16n and a plurality of service processors 17a, 17b. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The service processors 17a, 17b may be computer processing units included in the data storage system for processing requests and commands.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs, also referred to herein as logical units or LUNs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein.

In an embodiment of the data storage system, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Client software on the management system 36 may be used in connection with performing data storage system management by issuing commands to the data storage system 12 and/or receiving responses from the data storage system 12 over connection 20. In one embodiment, the management system 36 may be a lap top or desk top computer system.

Described in following paragraphs are techniques that may be performed by executing code of management software, for example, of the management system 36. Such code may be used in connection with performing data storage system management and administration. Although following paragraphs describe such techniques with reference to embodiments with data storage systems, it will be appreciated by those of ordinary skill in the art that techniques herein have broader applicability for use in connection with any suitable system and components.

In connection with data storage systems, a problem such as related to performance aspects of the systems may occur. A customer or other user performing data storage system administration may perform problem analysis and troubleshooting in an attempt to determine a cause and a corrective action to take. Such problem analysis may be complex and require a sophisticated level of understanding of many aspects such as performance terminology, management, how to utilize and interpret information derived from any existing software tools and interfaces, and the like. The customer may not have the above-mentioned required skills and knowledge needed to perform problem analysis and determine the cause and corresponding corrective action to take.

Described in following paragraphs are techniques that may be used in connection with performance troubleshooting and exploration to determine a cause of a performance problem. One or more performance metrics (also referred to herein as key performance metrics or KPIs) may be monitored to determine whether any of the performance metrics do not meet a specified level of performance, such as based on a threshold. When a performance metric does not meet a specified performance level, it may be determined that a performance problem exists requiring the attention of a data storage administrator or other user managing the data storage system. In accordance with techniques herein, guided performance troubleshooting and exploration may be performed to facilitate such problem analysis for the particular KPI not meeting the specified performance level. The techniques herein provide a guided step by step methodology with a user interface (UI). In connection with each step, a user may be presented with a predefined set of one or more options from which a user may make a selection. Each option may represent a possible next step that can be performed to facilitate problem analysis in connection with a methodology that effectively uses existing software analysis tools and UI selections in accordance with best practices. Thus, the options presented at each step in the UI may be those determined in accordance with recommended best practices for analyzing the particular problem. Responsive to selecting one of the current options, a recommended action associated with the selected option may be automatically performed whereby, as a result of performing the recommended action, the UI display may be updated to include relevant information to assist in problem analysis. The recommended action may include automated selection of one or more UI elements or controls which result in the updated UI display including the relevant information for the selected option. UI elements or controls may refer, for example, to a menu, menu option, button, and the like, such as may be displayed in connection with a graphical UI for user interaction whereby a user may select such UI elements to perform an responsive action. Thus, in accordance with techniques herein, a user does not need to have knowledge regarding the particular UI elements and controls which must be selected to obtain the updated UI display of the relevant information for problem analysis. Rather, in connection with techniques herein, selection of the particular UI elements or controls needed to obtain the desired information may be performed automatically. The automated selection may be with respect to particular UI elements identifying criteria used for further filtering, partitioning or "breaking down" a information currently displayed in connection with a step of the guided analysis. Responsive to selecting the option, the UI display may also be updated to include a second predefined set of one or more options in accordance with a next step in the problem analysis process. The particular options in the second predefined set may be dependent on any previously selected options for the current problem analysis. The second predefined set of options may provide for further exploration or "drilling down" into the performance problem thereby providing further details regarding the problem. The recommended action performed for a selected option may include automatically providing appropriate UI element selections to display information in the UI. Such automated processing may include, for example, automatically triggering selection of one or more UI elements to display relevant and useful information regarding the detected performance problem. The foregoing is described in more detail in following paragraphs.

What will now be described are figures illustrating exemplary UI displays or screenshots that may be included in an embodiment in accordance with techniques herein. The UI displays may correspond to a sequence of steps providing guided performance troubleshooting that may accompany performance metrics measurement. The UI displays provide a user with different sets of options at each step. Selection of an option at a step may provide for automated selection and manipulation of UI elements or controls affecting information included in a subsequent UI display as the exploration of the problem analysis proceeds. For example, a subsequent step may provide further details or insight into the problem analysis than previous steps.

Software may perform monitoring of one or more KPIs or metrics providing an indication regarding data storage system performance. For each such KPI, a threshold may be specified indicating a level of desired or acceptable performance. If a current value of a KPI is not in accordance with its associated metric, the KPI may be characterized as not having its acceptable performance level as denoted by the threshold. For example, a KPI may indicate an overall average response time (RT) for an I/O operation received from a host. The average RT KPI may have an associated RT threshold. If the current observed RT exceeds the RT threshold, it means that I/Os are taking longer than an acceptable or desired amount of time to complete and may therefore indicate a performance problem. Examples of KPIs for which such monitoring may be performed may include bandwidth (e.g., network bandwidth), latency (e.g., network latency), amount of "dirty cache", and the like. These and other possible KPIs that may be included in an embodiment are discussed in more detail elsewhere herein.

In response to detecting that a KPI exceeds, or is otherwise, not in accordance with, its associated threshold, a notification regarding a performance problem concerning the KPI may be provided to the user through the UI.

Figure 2:
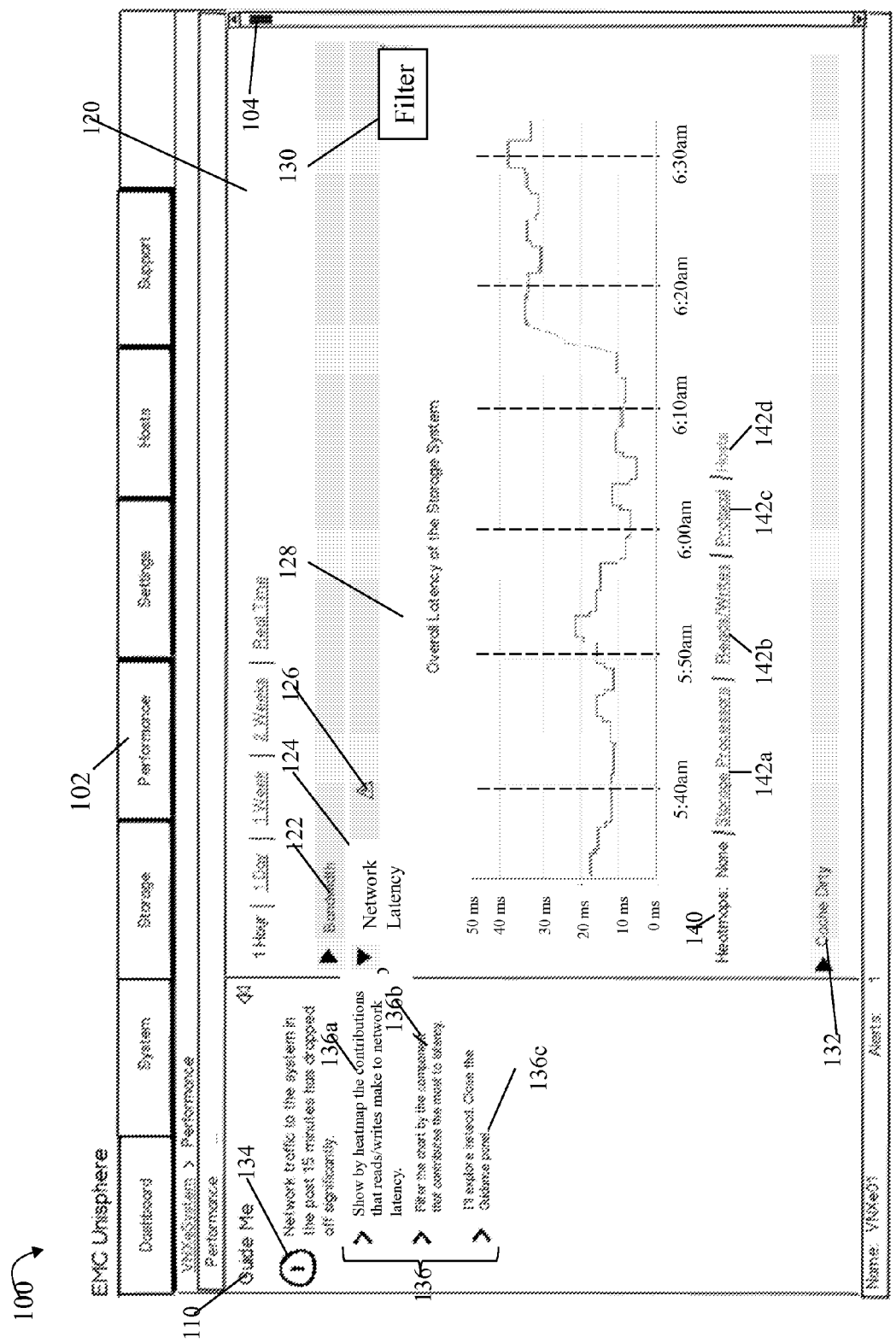
FIGS. 2-6 are examples of UI displays that may be used in an embodiment in accordance with techniques herein.

Referring to FIG. 2, shown is an example 100 of a first UI display that may be used in an embodiment in connection with techniques herein. In the example 100, the performance tab 102 may be selected to display information regarding data storage system performance. The example 100 includes a left hand portion 110 entitled GUIDE ME (also referred to as the guidance panel) used in providing guided performance for problem analysis. The example 100 also include a right hand portion 120 providing information on one or more KPIs. The portion 120 may include lines 122, 124 and 132 (denoted as a grayed line in the example 100) for the KPIs monitored in the system. In this example, element 120 is illustrated as providing information regarding 3 KPIs including bandwidth 122, network latency 124 and cache dirty 132. Scrolling using UI elements or controls, such as 104, would reveal additional lines for other monitored KPIs.

The bandwidth KPI 122 may be network bandwidth representing the total I/O traffic handled by the storage ports of the data storage system (e.g., such as front end ports receiving requests from hosts and returning data to the hosts responsive to the requests). The network bandwidth KPI may be also characterized as an aggregated measurement of the amount of data transferred to and/or from the data storage system and may be an average over a time period. Network bandwidth may be expressed in terms of a value that is a data transfer rate, such as MB/second. The latency KPI 124 may be network latency representing the latency incurred when a host sends a data request to the data storage system. An embodiment may use a network latency measurement denoting the round trip latency experienced which includes a first latency from the host to the data storage system and a second latency returning from the data storage back to the host for the request. Thus, the network latency for a data request may represent the average "roundtrip" latency for an I/O request that is sum of the foregoing first and second latency values and may exclude the amount of time for processing of the data request once received by the data storage system. The network latency may be an aggregated average across all read and write operations received on the data storage system over a time period. The cache dirty KPI 132 may indicate the portion of cache (e.g., in percentage) that has been written to cache but not yet flushed to disk. In an embodiment, the data storage system may receive a write operation from a client such as a host. The write data may be written to cache of the data storage system and then destaged at a later point in time from the cache to the physical data storage device. Similarly, in response to a read request received from the host, the requested read data may be read from the physical storage device and stored in cache. The data read may then be retrieved from cache and sent to the host in response to the read request. Thus, data transferred to and/or from the physical storage devices for servicing requests may utilize cache of the data storage system.

In this example, assume a currently observed value for the network latency KPI is not in accordance with the specified threshold (e.g., has exceeded a specified threshold) thereby indicating a network latency performance problem. The monitoring software noted above may detect that the current network latency KPI exceeds its associated threshold and generate an alert condition. Responsive to the alert condition, the user may be provided notification regarding the network latency KPI and associated network latency performance problem through the UI display. For example, an alert or "needs attention" icon 126 may be included in the line 124 associated with the network latency KPI. A graph of the overall network latency for the storage system may be displayed in 128 such as for the last hour. In the overall latency graph or chart of 128, the current time may be about 6:30 a.m. and the latency is illustrated as increasing significantly from 6:15 a.m.-6:30 a.m. The graph of 128 indicates a Y axis value of latency in milliseconds (ms) with the time of day in minutes on the X axis. Additionally, in the GUIDE ME portion 110, the user may be provided with a general description of the problem in a first step 134 indicating that network traffic to the data storage system has dropped off significantly in the last 15 minutes (as illustrated by 128).

Element 136 may represent a first predefined set of options also displayed to the user. Element 136 includes 3 options from which a user may make a selection as a first step in analyzing the network latency performance problem described by 134. Generally, the set 136 includes options 136a, 136b which are possible first steps that may be taken in a sequence of selection for analyzing the current network latency performance problem. Each of the options 136a, 136b may be recommended possible next steps in accordance with best practices of problem exploration and analysis. Option 136a may be a first step of a first sequence of steps that may be performed in connection with problem analysis. Option 136b may be a first step of a different second sequence of steps performed in connection with problem analysis. The foregoing first and second sequences of steps may be predefined or predetermined in accordance with best practices. In other words, the foregoing first and second sequences of possible steps may be included in a table or a database, encoded in rules, or any other suitable means for storing such information for use with techniques herein. The particular steps of each sequence may be predetermined in accordance with known best practices for troubleshooting this particular KPI performance problem using the UI and tools of the current system (e.g., determined by an expert or other individual knowledgeable about the data storage system and problem analysis). For example, the possible options from which a user may take at each step may be included in a troubleshooting tree described elsewhere herein in more detail.

Option 136a indicates that a recommended action is to show/view by heatmap the contributions that reads and writes make to network latency. To perform the recommended action for option 136a, one or more UI elements may need to be selected such as selection of 142b. Option 136b indicates that a recommended action is to filter the displayed chart of 128 by the component (read or write) that contributes the most to network latency. To perform the recommended action for option 136b, one or more UI elements may need to be selected such as selection of filter button 130 and one or more additional UI element selections. In connection with techniques herein, the selection of the various UI elements to implement the action for a selected option are performed automatically in response to selecting the particular option 136a or 136b. It should be noted that without use of the techniques herein, the user may not otherwise know that the above-mentioned options 136a, 136b are useful possible first steps to troubleshoot the current network latency performance problem. Additionally, the user may also not otherwise know how to manipulate the UI elements or controls to obtain perform the desired action and view the results of the action associated with such options. Thus, the foregoing is one example illustrating how the techniques herein may be used to provide a guided flow path of steps using the UI display to automatically perform a recommended action for a selected option from a set of one or more such options based on best practices.

In connection with this UI display for the first step 134 and other UI displays, the possible options of 136 may also include an option 136c to further explore the problem without further assistance from the guided performance UI. As a result, selecting the last option 136c results in closing the guidance (e.g., GUIDE ME) panel 134 and allowing the user to continue to display further information by making his/her own UI selections from existing UI elements and controls such as the filter button 130, selecting any one of the heatmaps 142a-142d that may be active/enabled, selecting to view information regarding another KPI such as by selection of 122 or 132, and the like. Generally, a user may choose to manually make his/her own UI element selections without the guidance of the guidance panel 110. For example, selection of 130 may provide a drop-down list of different categories by which the information of 128 may be further filtered or partitioned. Selection of one the heatmap options 142a-142c would result in providing one of the different heatmaps for the overall latency information of 128. Elements 130, 140, and 142a-d are described in more detail in following paragraphs. However, rather than explore and perform problem analysis by having the user manually traverse through various menus, make his/her own UI selections, and the like, techniques herein provided for automatically performing any necessary UI selections to implement a recommended action associated with a selected one of the options 136a, 136b.

At this first step in processing in connection with FIG. 2, it should be noted that the heatmap categories of 142a, 142b and 142c may be active/enabled however the category 142d for hosts is currently inactive/disabled. This is because at this point in processing, the information currently displayed in 128 of FIG. 2 may not be further broken down or partitioned based on hosts. As described in more detail elsewhere herein, the information displayed in a step N may be further refined (e.g., further partitioned, "broken down" or filtered) in a subsequent step N+1. The particular UI elements enabled or disabled at a step may reflect whether information displayed in a current step may be partitioned or further broken down based on particular categories.

With reference to the guidance panel 110 in this particular example, a user may select option 136a to show by heatmap the contributions that reads and writes make to network latency. Responsive to selecting option 136a, the UI may be updated to include the display 200 of FIG. 3.

Figure 3:
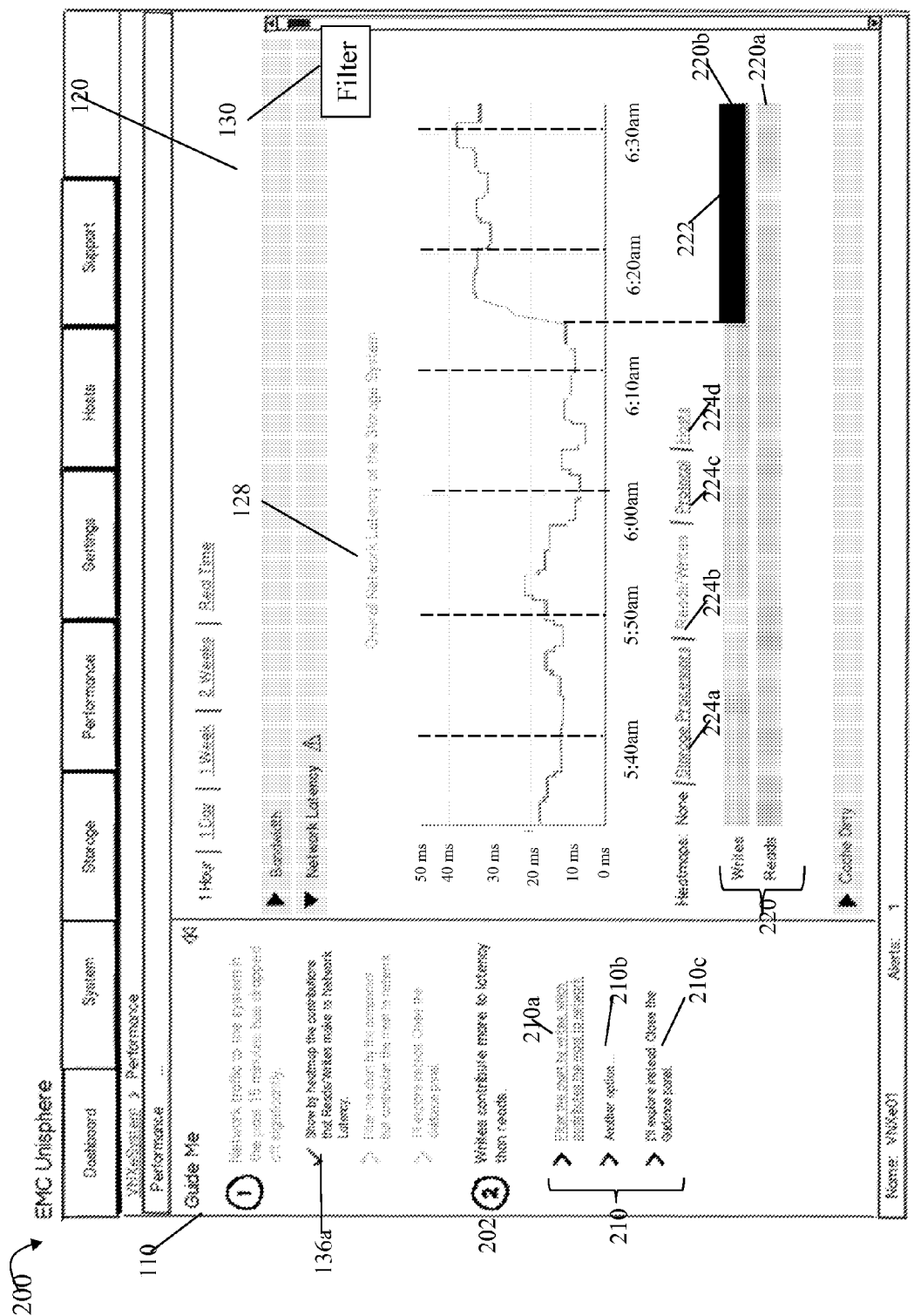

With reference to FIG. 3, the example 200 includes a second UI display that may be used in an embodiment in connection with techniques herein. The guidance panel 110 has been updated to indicate that option 136a was selected as a first step and to display a second predefined set of options 210 that a user may make in connection with a second step 202. Additionally, responsive to selecting option 136a, the right handside panel 120 is also automatically updated to display the heatmaps 220. Note that this automatic updating of 120 to include the heatmaps of 220 displays equivalent information as if the user had manually selected 142b read/writes heatmap UI option of FIG. 2. However, in accordance with techniques herein using the guided logical flow path of steps and options, such selection of UI elements is performed automatically in response to the user selecting the corresponding option 136a of FIG. 2.

The total or overall network latency at each point in time as represented in the graph 128 regarding the network latency may be further partitioned or broken down in a variety of different ways. In connection with reads and writes, the overall network latency at a point in time as represented in the top graph 128 may be partitioned to include a first amount of network latency attributed by read operations and a second amount of network latency attributed by write operations. The foregoing first and second amounts at each point in time (time of day as represented in the top portion graph) may be displayed using a first heat map 220a for network latency due to reads and a second heat map 220b for network latency due to writes. The heatmaps of 220 may be color coded, shaded, or otherwise provide some other visual indication regarding graduated levels regarding an amount of network latency attributed by read operations and an amount of network latency attributed by write operations. The heatmap provides an example of such a visual indicator whereby the level of saturation or darkness may indicate an amount of network latency. The darker that portions of the heatmaps 220a, 220b are at various points, the larger the contribution to network latency. For example, element 222 denotes a portion of the write heatmap 220b with the highest level of network latency contribution relative to other portions displayed in the heatmaps 220a, 220b.

Element 202 denotes the second step and provides further information regarding the results of performing the first selected option 126a. Element 202 indicates that writes contribute more to the network latency than reads which is illustrated by the heatmaps 220. It should be noted that such a determination may be made with respect to a time period such as the 15 minute time period from 6:15-6:30 a.m which caused the initial network latency threshold violation that generated the alert condition.

Element 210 may represent a second predefined set of options displayed to the user. Element 210 includes 3 options from which a user may make a selection as a second step in analyzing the network latency performance problem. Generally, the set 210 includes options 210a, 210b which are possible second steps that may be taken in a sequence of selection for analyzing the current network latency performance problem. Each of the options 210a, 210b may be recommended next steps in accordance with best practices of problem exploration and analysis. Option 210a may be a second step of a sequence of steps that may be performed in connection with problem analysis. Option 210b may be a second step of a different sequence of steps performed in connection with problem analysis. The foregoing sequences of steps may be predefined or predetermined in accordance with best practices as described above. It should be noted that the recommended next options 210a, 210b for the second step 202 are dependent on the previous option 136a having been selected as the first step. In other words, a different set of options may be displayed as possibilities for the second step if the user had selected, for example, option 136b of FIG. 2 rather than 136a of FIG. 2 as described above.

Option 210a indicates that a recommended action is to filter the overall network latency chart of 128 by the writes since writes contributes the most to network latency. To perform the recommended action for option 210a, one or more UI elements may need to be selected such as selection of filter button 130 and one or more additional UI element selections. In connection with techniques herein, the selection of the various UI elements to implement the action for a selected option are performed automatically in response to selecting the particular option such as 210a.

The options of 210 also include a third last option 210c analogous to 136c as described above in connection with FIG. 2. Thus, elements 136c and 210c correspond to an option to exit or close out of the guided performance troubleshooting techniques whereby the user may then perform other processing such as to further explore independently without guidance using techniques herein.

At this second step in processing in connection with FIG. 3, it should be noted that the heatmap categories of 224a and 224c may be active/enabled however the categories 224b and 224d may be currently inactive/disabled. This is because at this point in processing, the information currently displayed in 128 of FIG. 3 may not be further broken down or partitioned based on such disabled categories.

With reference to the guidance panel 110 in this particular example, a user may select option 210a of FIG. 3 to filter the chart 128 by writes. Responsive to selecting option 210a, the UI may be updated to include the display 300 of FIG. 4.

Figure 4:
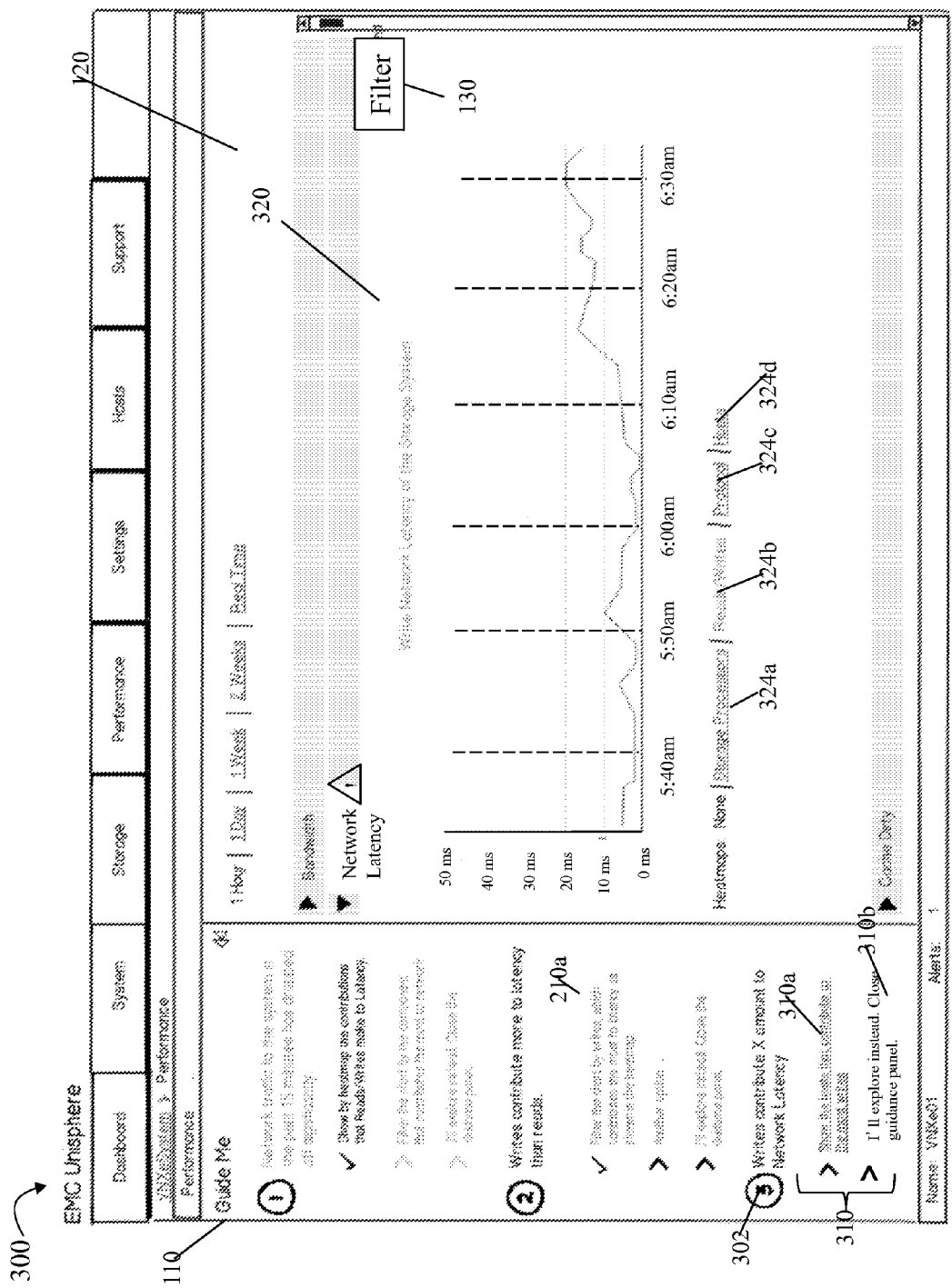

With reference to FIG. 4, the example 300 includes a third UI display that may be used in an embodiment in connection with techniques herein. The guidance panel 110 has been updated to indicate that option 210a was selected as a second step and to display a third predefined set of options 310 that a user may make in connection with a third step 302. Additionally, responsive to selecting option 210a, the right handside panel 120 is also automatically updated to illustrate the graph or line chart 320 of network latency due to only writes (but not reads). Note that this automatic updating of 120 to include the updated chart 320 displays equivalent information as if the user had manually selected the filter button 130 of FIG. 3 and one or more additional UI selections (e.g., menu or other UI element selections) to perform the action of filtering the overall network latency by writes and then update the display. For example, with reference to FIGS. 3 and 8, selection of 130 of FIG. 3 may result in first displaying a set of filter category menus 730. A user would have to manually select one of the filter category menus, such as 730b, to filter by reads or writes. In response to selecting 730b, a list of further menu options of 740b (including a read option 744a and a write option 744b) may be displayed. The user must now select 744b to filter by writes. In contrast to the foregoing manual UI selections made to filter by writes, however, in accordance with techniques herein using the guided logical flow path of steps and options, such selection of UI elements to filter network latency by writes is performed automatically in response to the user selecting the corresponding option 210a of FIG. 3.

With reference to FIG. 4, element 310 includes the third set of predefined options from which a user may make a selection as the third step 302 in analyzing the network latency performance problem. Generally, the set 310 include option 310a which is a possible third step that may be taken in a sequence of selection for analyzing the current network latency performance problem. The option 310a may be a recommended next step in accordance with best practices of problem exploration and analysis. Option 310a may be a third step of a sequence of steps that may be performed in connection with problem analysis. The foregoing sequence of steps may be predefined or predetermined in accordance with best practices as described above. It should be noted that the recommended next option 310a for the third step 302 is dependent on the previous option 136a having been selected as the first step and is also dependent on the previous option 210a having been selected as the second step. In other words, a different set of options may be displayed as possibilities for the third step if the user had selected a different option other than 136a of FIG. 2 and/or a different option other than 210a of FIG. 3 as described above.

Option 310a indicates that a recommended action is to now show the hosts that contribute or perform the most writes (e.g., show the top N hosts which perform the most writes). To perform the recommended action for option 310a, one or more UI elements may need to be selected such as selection of hosts heatmap button 324d. In connection with techniques herein, the selection of the various UI elements to implement the action for a selected option are performed automatically in response to selecting the particular option such as 310a.

The options of 310 also include a second last option 310b analogous to 136c and 210c as described above, respectively, in connection with FIGS. 2 and 3. Thus, elements 136c, 210c, and 310b correspond to an option to exit or close out of the guided performance troubleshooting techniques whereby the user may then perform other processing such as to further explore independently without guidance using techniques herein.

At this third step in processing with FIG. 4, it should be noted that the heatmap categories of 324a, 324c and 324d may be active/enabled however the category 324b is currently inactive/disabled. With FIG. 4 in comparison to FIG. 3, the hosts heatmap option 324d becomes active because, in accordance with allowed processing, the overall network latency information in 128 of FIG. 3 must first be broken down or filtered by reads or writes before further partitioning is allowed based on hosts 324d. Selection of option 210a of FIG. 3 provided for such filtering of the overall network latency by writes as displayed in 320 of FIG. 4. As a result, the information 320 of FIG. 4 may now be filtered by hosts 324d.

With reference to the guidance panel 110 of FIG. 4 in this particular example, a user may select option 310a of FIG. 3 to show the hosts that perform the most writes. Responsive to selecting option 310a, the UI may be updated to include the display 400 of FIG. 5.

Figure 5:
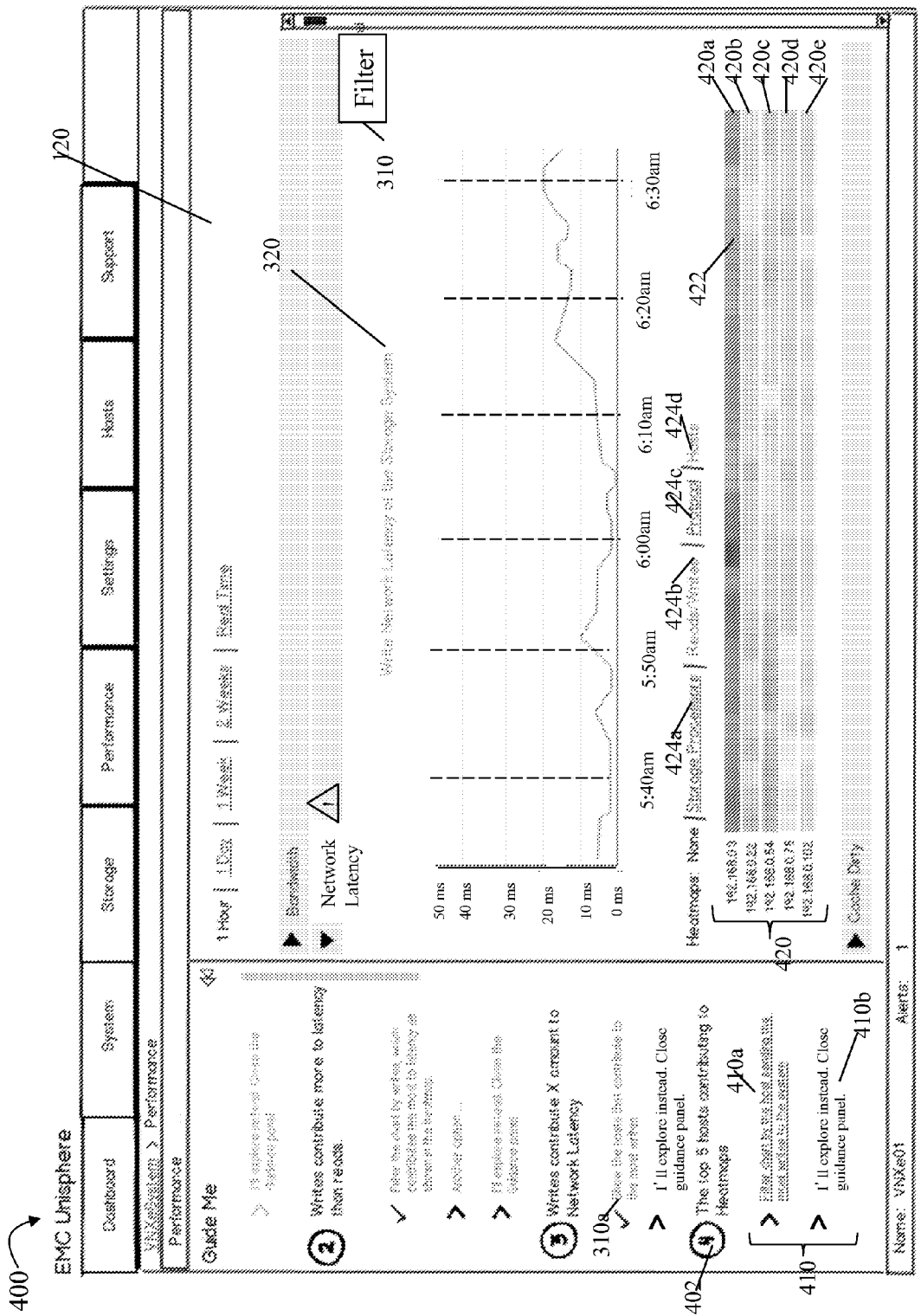

With reference to FIG. 5, the example 400 includes a fourth UI display that may be used in an embodiment in connection with techniques herein. The guidance panel 110 has been updated to indicate that option 310a was selected as the third step and to display a fourth predefined set of options 410 that a user may make in connection with a fourth step 402. Additionally, responsive to selecting option 310a, the right handside panel 120 is also automatically updated to illustrate the heatmaps 420 for the top 5 hosts which perform the most write operations. Note that this automatic updating of 120 to include the heatmaps 420 displays equivalent information as if the user had manually selected the hosts heatmap button 324d of FIG. 4. In contrast to the foregoing manual UI selection that may be made to display the host heatmaps 420, in accordance with techniques herein using the guided logical flow path of steps and options, such selection of the UI element(s) necessary to display the host heatmaps 420 as in FIG. 5 may be performed automatically in response to the user selecting the corresponding option 310a of FIG. 4.

With reference to FIG. 5, element 410 includes the fourth set of predefined options from which a user may make a selection as the fourth step 402 in analyzing the network latency performance problem. Generally, the set 410 includes option 410a which is a possible fourth step that may be taken in a sequence of selection for analyzing the current network latency performance problem. The option 410a may be a recommended next step in accordance with best practices of problem exploration and analysis. Option 410a may be a fourth step of a sequence of steps that may be performed in connection with problem analysis. The foregoing sequence of steps may be predefined or predetermined in accordance with best practices as described above. It should be noted that the recommended next option 410a for the fourth step 302 is dependent on having previously selected option 136a of FIG. 2 as the first step, selected option 210a as the second step, and also having selected option 310a as the third step. In other words, a different set of options may be displayed as possibilities for the fourth step if the user had selected a different sequence of options other than 136a of FIG. 2, 210a of FIG. 3, and then 310a of FIG. 4 as described above.

Option 410a indicates that a recommended action is to now further filter the chart of write network latency information 320 by the host sending the most writes to the data storage system (e.g. filter by host 192.168.0.3 as represented by heatmap 420a so that the line chart 320 is further updated to reflect network latency due to only the host 192.168.0.3 (having the most writes of all hosts). To perform the recommended action for option 410a, one or more UI elements may need to be selected such as selection of filter button 130 and one or more additional UI elements. For example, with reference to FIGS. 5 and 8, selection of 130 of FIG. 5 may result in first displaying a set of filter category menus 730. A user would have to manually select one of the filter category menus, such as 730d, to filter by a particular host. In response to selecting 730d, a list of further menu options of 740c (including a list of hosts 748a-e) may be displayed. The user must now select 748a to filter by the desired host. In contrast to the foregoing manual UI selections made to filter by a particular host, however, in accordance with techniques herein using the guided logical flow path of steps and options, such selection of UI elements to filter network latency by a particular host having the most writes of all the hosts is performed automatically in response to the user selecting the corresponding option 410a of FIG. 5.

The options of 410 also include a second option 410b analogous to 136c, 210c, and 310b as described above, respectively, in connection with FIGS. 2, 3 and 4. Thus, elements 136c, 210c, 310b and 410b correspond to an option to exit or close out of the guided performance troubleshooting techniques whereby the user may then perform other processing such as to further explore independently without guidance using techniques herein.

With reference to the guidance panel 110 of FIG. 5 in this particular example, a user may select option 410a of FIG. 4 to show the write network latency for the single host 192.168.0.3 that performed the most writes of all host. Responsive to selecting option 410a, the UI may be updated to include the display 500 of FIG. 6.

Figure 6:
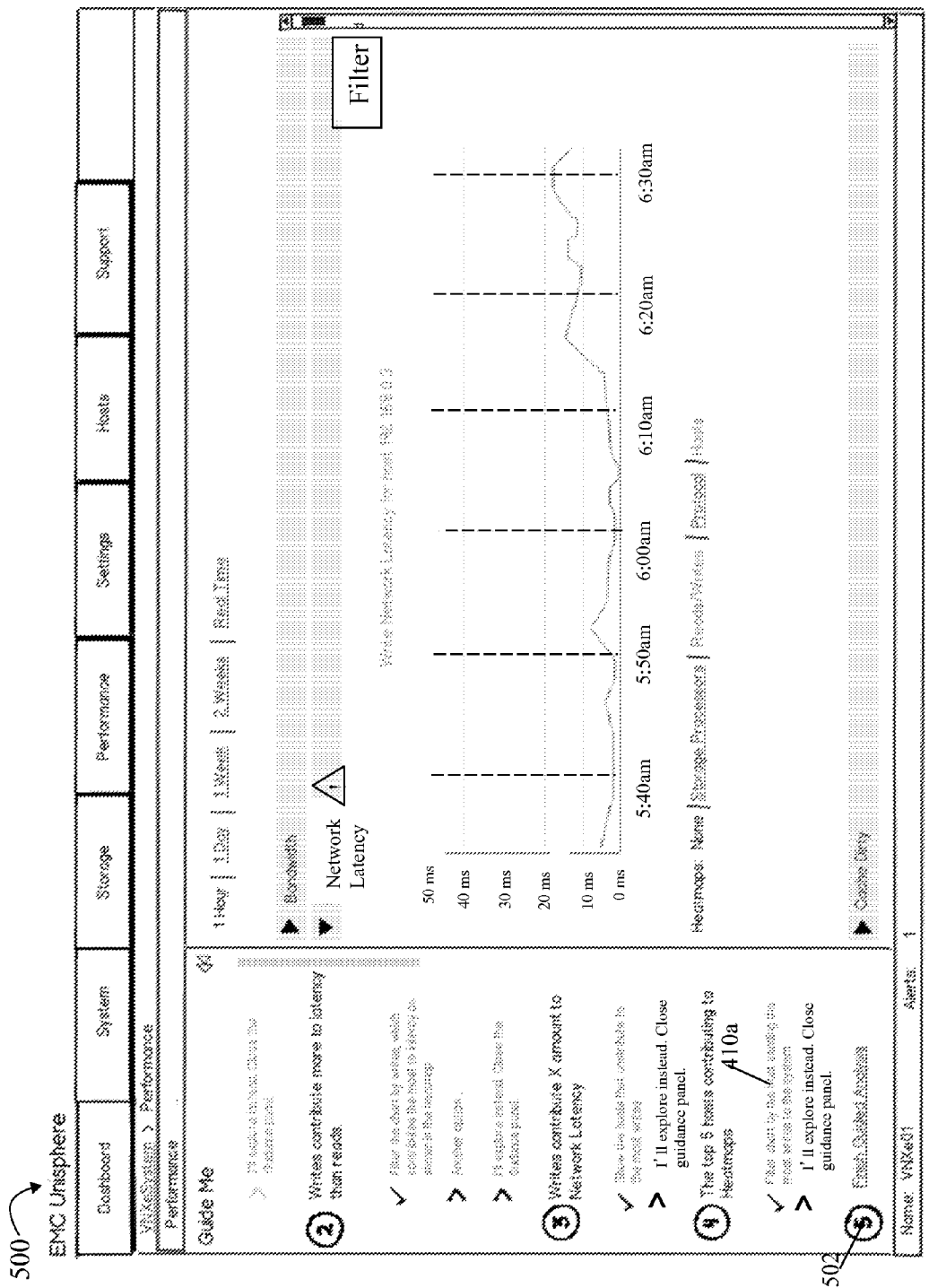

With reference to FIG. 6, the example 500 includes a fifth UI display that may be used in an embodiment in connection with techniques herein. The guidance panel 110 has been updated to indicate that option 410a was selected as the fourth step and to display a fifth step 502 indicating that the guided analysis has been completed and there are no further steps or options in to be taken for problem analysis.

Based on the foregoing sequence of UI displays, the user has been guided through a selection process of steps in which options are presented at each step that may provide further information or insight in connection with analyzing the detected network latency problem. The foregoing sequence of UI displays provides a guided flow path of processing steps and options whereby a subsequent step further filters, breaks down, or refines information from the previous step. Thus, each step in the process provides the user with greater insight and more detail regarding items for further investigation to diagnose the problem and determine a cause. For example, the foregoing sequence identified the particular host and type of operations (writes) which appeared to be contributing the most to the increased network latency. In this manner, the user has identified the particular host and may now, for example, possibly look at why the particular host is sending so many writes, may perform processing to adjust or throttle (e.g., possibly result in decreasing) the number of writes from the host, and the like.

Using the techniques as illustrated, the user is not required to have knowledge regarding particular steps of a methodology for troubleshooting a particular problem. Additionally, the user is also not required to have knowledge regarding how to actually implement or perform such steps, such as through various UI navigational steps by selecting one or more UI elements to complete a particular step providing desired information. In connection with techniques herein, the user is guided through steps and presented with different options and recommended actions. Furthermore, once a user selects a particular option at a step, the recommended action associated with the option is automatically implemented such as through automatically performing processing to select the appropriate UI elements (e.g., to manipulate the appropriate menus, buttons, selections, and the like to display desired further filtered information.

Figure 7:
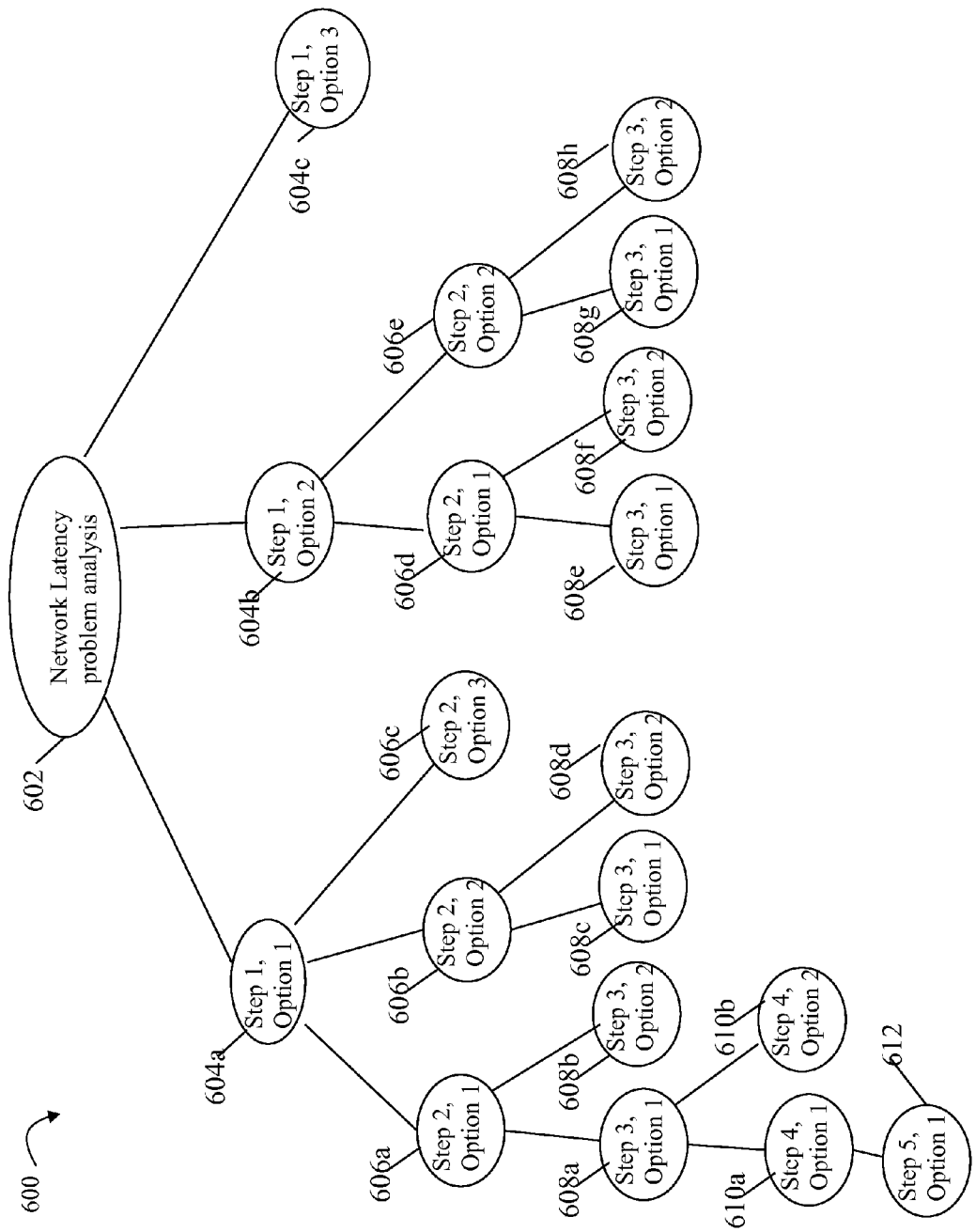
FIG. 7 is an example illustrating a troubleshooting tree that may be used in an embodiment in accordance with techniques herein.

Referring to FIG. 7, shown is an example illustrating a representation of a troubleshooting tree for network latency problem analysis. Generally, the example 600 includes in a tree-like representation logical flow paths of different options that may be presented to a user in connection with techniques herein. The example 600 is a tree including a root node 602 denoting the detected problem. The tree also includes a plurality of levels of node. For reference purposes, the root node 602 may denote a first level in the tree. The second level in the tree may include nodes 604a-604c. The third level in the tree may include nodes 606a-e. The fourth level in the tree may include nodes 608a-h. The fifth level in the tree may include nodes 610a-b. The sixth level in the tree may include node 612. Each node at level N may be leaf node (thereby not having any child nodes), or may be a parent node having one or more child nodes at level N−1 (connected thereto). The tree represents the predefined sets of possible options for each step which depends on the previously selected options, if any. The nodes 604a-c at the second level may represent the first set of options presented to a user in a first processing step such as described in FIG. 2. Assume that option 604a is selected. In this case, the tree indicates the next predefined set of options displayed for the second step as the child nodes 606a-c of node 604a (corresponding to the last selected option). Assume that option 606a is selected in the second step. In this case, the tree indicates the next predefined set of options displayed for the third step as child nodes 608a-b of node 606a (corresponding to the last selected option). Assume that option 608a is selected in the third step. In this case, the tree indicates the next predefined set of options displayed for the fourth step as child nodes 610a-b of node 608a. Assume that option 610a is selected and the tree now indicates the only next possible option is 612 for the fifth step which terminates the guided performance analysis.

To further illustrated, in connection with the first step and possible options represented by nodes 604a-c, if 604b is selected rather than the option 604a, the child nodes 606d-e of nodes 604b now denote the possible options for the second step. In this manner, the tree represents predefined sets of options for each step whereby the current set of options displayed is dependent on the previous sequence of selected options in connection with previous steps. A path from the root to a leaf node may correspond to a particular sequence of options selected by a user in connection with a guided performance analysis. A path from the root node to a non-leaf node may correspond to a sequence of options selected by a user up to a point in time. In connection with an embodiment as described above, when at a non-leaf node, the user may choose to exit guided performance analysis. It should be noted that options providing for exiting the guided performance analysis (e.g., 136c of FIG. 2, 210c of FIG. 3) may or may not be represented as options in the troubleshooting tree. It may be, for example, that such an option is always included as a last displayed option of all steps and is therefore not represented in the tree.

An embodiment may include a tree as represented in FIG. 7 for each performance problem for which guided performance analysis may be performed in accordance with techniques herein.

Additionally, as described herein, a recommended action determined in accordance with best practices is presented as the displayed option. The recommended action is performed in response to selecting the option. The recommended action may include filtering or partitioning currently displayed information based on criteria and then updating the UI display with a representation of the further filtered information. For example, with reference back to FIG. 2 and option 136a, the overall network latency values of 128 may be further partitioned based on read and write contributions. Option 136a represents the foregoing partitioning using two separate heatmaps for reads and writes as displayed in 220 of FIG. 3 responsive to selecting option 136a. To perform the recommended action, processing is automatically performed to select the appropriate UI elements to obtain the two heatmaps displayed in 220 (e.g., without requiring the user to make any additional manual UI element selections other than option 136a). Thus, responsive to selecting an option represented by a particular node, processing may be performed to automatically select the abovementioned UI elements for performing the recommended action.

The information represented in FIG. 7 (e.g., the options, corresponding recommended actions represented, UI element selections or manipulations for performing the recommended actions, and the like) may be encoded or stored in any suitable form known in the art. For example, an embodiment may store such information using tables, encoding the information in rules, and the like, which may be used by executing code to perform processing of the techniques described.

Figure 8:
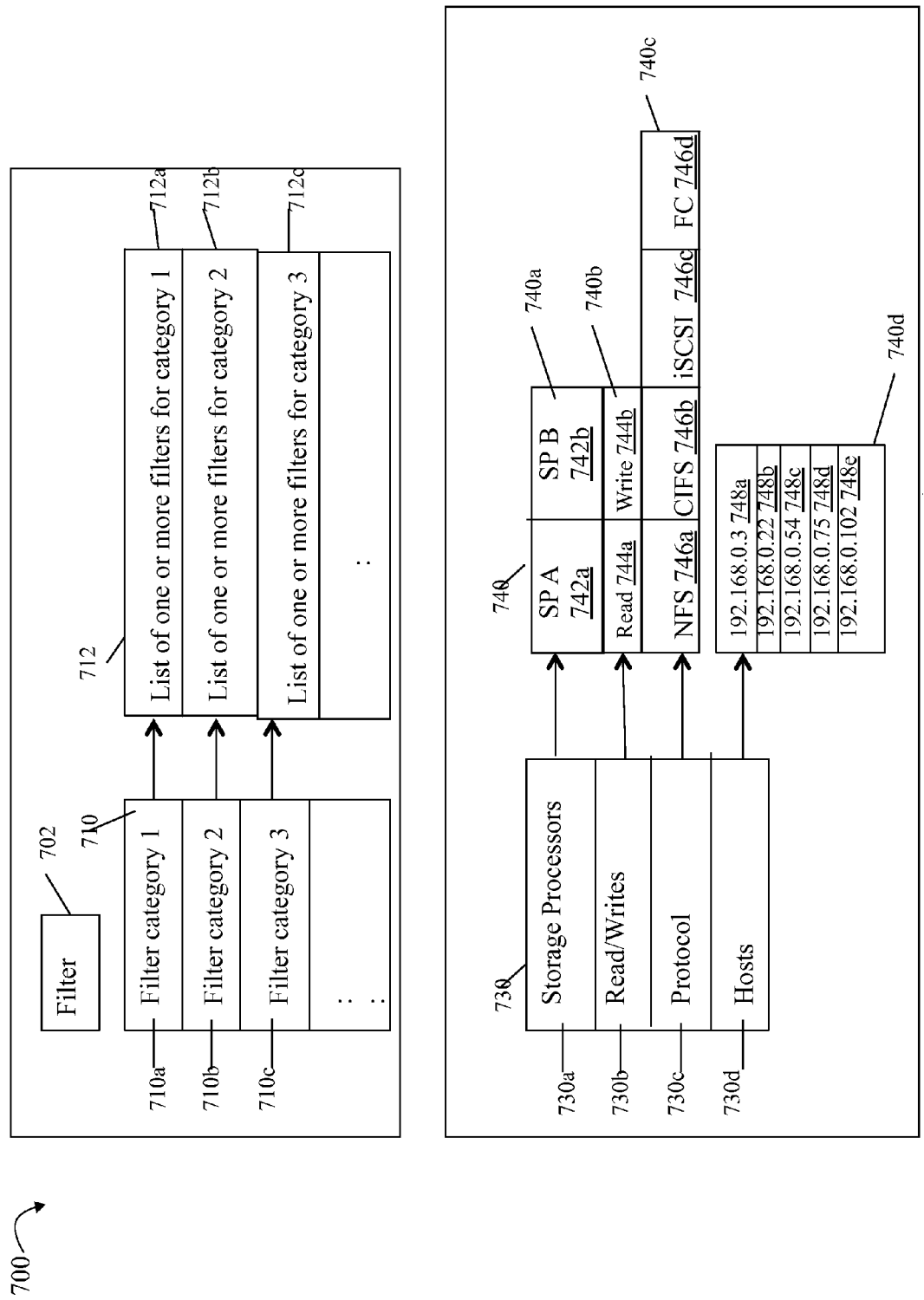
FIG. 8 is an example illustrating filter categories and associated filter lists that may be used in an embodiment in accordance with techniques herein.

Referring to FIG. 8, shown is an example representing in more detail information that may be displayed in connection with manual UI selections. For example, with reference back to FIGS. 2-6, element 130 may represent a filter button. When selected, the filter button 702 may display a list of drop-down menus 710 corresponding to different filter categories 710a-c. Element 712 may represent different filter lists for each of the categories included in 710. A user may make a manual UI selection of one of the filter categories (e.g., select one of 710a-c). Responsive to such selection, one of the lists 712a-c of one or more filters corresponding to the selected filter category is displayed. For example, as mentioned elsewhere herein, element 730 may represent an exemplary list of filter categories analogous to element 710 and element 740 may represent an exemplary list of filters for the categories of 730. Each of 730a-d, respectively, has a corresponding filter list 740a-d. A user select filter button 702 and be presented with first information corresponding to the filter categories of 730. A selection of one of the filter categories 730a-d may be made. Responsive to selecting the one filter category, a corresponding one of the lists 740a-d may be displayed. The user may then make another selection of filtering criteria from the displayed one of the lists 740a-d.

It should be noted that various filter categories may be active/enabled or inactive/disabled based on the current step or point in exploration. For those active filters and heatmaps, the tree may include the possible sequences of steps and options at each step based on previously selected options.

What will now be described with reference to FIGS. 9-11 are further examples of different KPIs that may be used in an embodiment in accordance with techniques herein. It should be noted that an embodiment may perform processing as described herein using any one or more of these exemplary KPIs, and/or may also use techniques herein with other KPIs not explicitly included herein.

Referring to FIG. 9, shown is a first table of KPIs that may be used in connection with techniques herein. The table 800 includes column 810 denoting a KPI group or type of one or more KPIs, column 820 identifying one or more KPIs of each group, and column 830 lists the categories by which KPIs may be further partitioned, filtered, or otherwise broken down using heatmaps, updated line charts, and the like, as may be provided in an embodiment. Each of the rows 812, 814, 816 represent information for a single KPI group. Row 812 identifies the CPU KPI group in column 810, identifies the single KPI of the CPU group in 822 and identifies in 832 the categories by which the KPIs in column 820 may be further partitioned or broken down. For example, the CPU utilization metric of 822 may be partitioned or further broken down by storage processor SP A and SP B in a system including two storage processors. With reference back to FIG. 8 and also with respect to various heatmap options that may or may not be active, column 830 may represent the possible filter categories by which each of the KPIs in column 820 of the same row may be broken down. For example, the categories in column 830 may denote the different filter categories and filter category lists presented when making manual UI selections. Additionally, the active filter categories and associated lists may correspond to different criteria used for filtering or breaking down information in connection with recommended actions corresponding to the different options presented using the guided problem analysis as described herein.

It should be noted that an initial set of information for a KPI in a column 820 may be partitioned (e.g., filtered or broken down) repeatedly, for example, by applying first criteria in connection with a first category of column 830 to obtain first information and then filtering the first information by applying second criteria in connection with a second category of column 830, and so on, depending on the particular KPI and associated categories (and which of these categories are enabled at different points in time for a set of current data to which the criteria is applied).

Row 814 identifies the network port KPI group which includes two KPIs of 824: network bandwidth and network IOPS (e.g., I/Os per second or I/O throughput). As denoted by 834, both network bandwidth and network IOPS may be further broken down by storage processor and port type. Row 816 identifies the LUN KPI group which includes 5 KPIs of 826: application response time, application bandwidth, application I/O size, and application queue length. As denoted by 836, the KPIs of 826 may be further broken down by storage processor, application, application type, read/write (I/O type), storage pool, data size, provisioning LUN type (e.g., whether a LUN is provisioned as a thick LUN or a thin (virtually provisioned LUN), and target LUN. It should be noted that the filtering category (or category by which a KPI may be further broken down) of data size is only used for the application IOPs KPI of 826. In connection with the above, a storage pool may be a logical grouping of physical devices from which logical devices, such as LUNs, have storage provisioned. A thick LUN may be a LUN having its storage provisioned from a pool whereby all the storage for the LUN capacity is allocated when the LUN is created. In contrast, a thin or virtually provisioned LUN may have portions its storage allocated as data is written to particular portions of the LUN. Thus, Referring to FIG. 10, shown is a second table of KPIs that may be used in connection with techniques herein. The table 900 has a format of information similar to that as described above in connection with FIG. 9. Row 922 identifies the disk (or more generally physical storage device) KPI group which includes the KPIs of 926: disk IOPS, disk bandwidth, disk errors, disk service time, disk response time, and disk queue length. As denoted by 932, the KPIs of 926 may be further broken down by storage tier (e.g., physical drive type or technology), storage pool, RAID type, disk or physical device, bus (e.g., internal with the system which services particular I/Os), or DAE (disk array enclosure). A DAE may be a physical enclosure associated with a group of physical disks providing storage in a system. Row 924 identifies the protocol KPI group which includes the KPIs of 928: protocol response time, protocol bandwidth, and protocol IOPS. As denoted by 934, the KPIs of 928 may be further broken down by protocol, protocol version, storage processor, protocol operations, and data size (e.g., based on fixed size ranges). For example, in connection with techniques herein, first information displayed may provide an overall average number of IOPs across all supported protocols (e.g., such as NFS, CIFS, iSCSI, FC, and the like). It may be desirable to only look at the average number of IOPs for one or more particular protocols such as only NFS. In this manner, the first information may be broken down or filtered to only provide the IOPs for NFS. Additionally, the NFS IOPS may be further broken down or filtered by data size or protocol operation.

Referring to FIG. 11, shown is a third table of KPIs that may be used in connection with techniques herein. The table 1000 has a format of information similar to that as described above in connection with FIGS. 9 and 10. Row 962 identifies the NAS (network attached storage) client KPI group which includes the KPIs of 966: shared folder throughput, shared folder response time, shared folder bandwidth, and shared folder average I/O size. As known in the art, a shared folder may correspond to a folder including files whereby the folder is shared among multiple clients. In an embodiment, a client may be on a network and have an associated IP address. As denoted by 972, the KPIs of 966 may be further broken down by storage processor, read/write operations, data mover and client. A data mover may be characterized as a logically defined grouping of CFS and/or NFS file system and servers. Thus, KPIs of 966 may be further broken down or filtered by data mover.

Row 964 identifies the cache KPI group which includes the KPIs of 968: cache hit and cache dirty. As denoted by 974, the KPIs of 968 may be further broken down by cache type. For example, an embodiment may have different types of cache in which data may be stored. An embodiment may store data read to/from physical devices in cache which is used by each SP. Also, an embodiment may store data in another type of cache referred to as "FAST" cache. The FAST cache may be configured on flash-based storage devices (e.g., more generally solid state storage devices) as another type of storage used for caching Thus, data may be cached in either of the two types of cache.

Figure 12A:
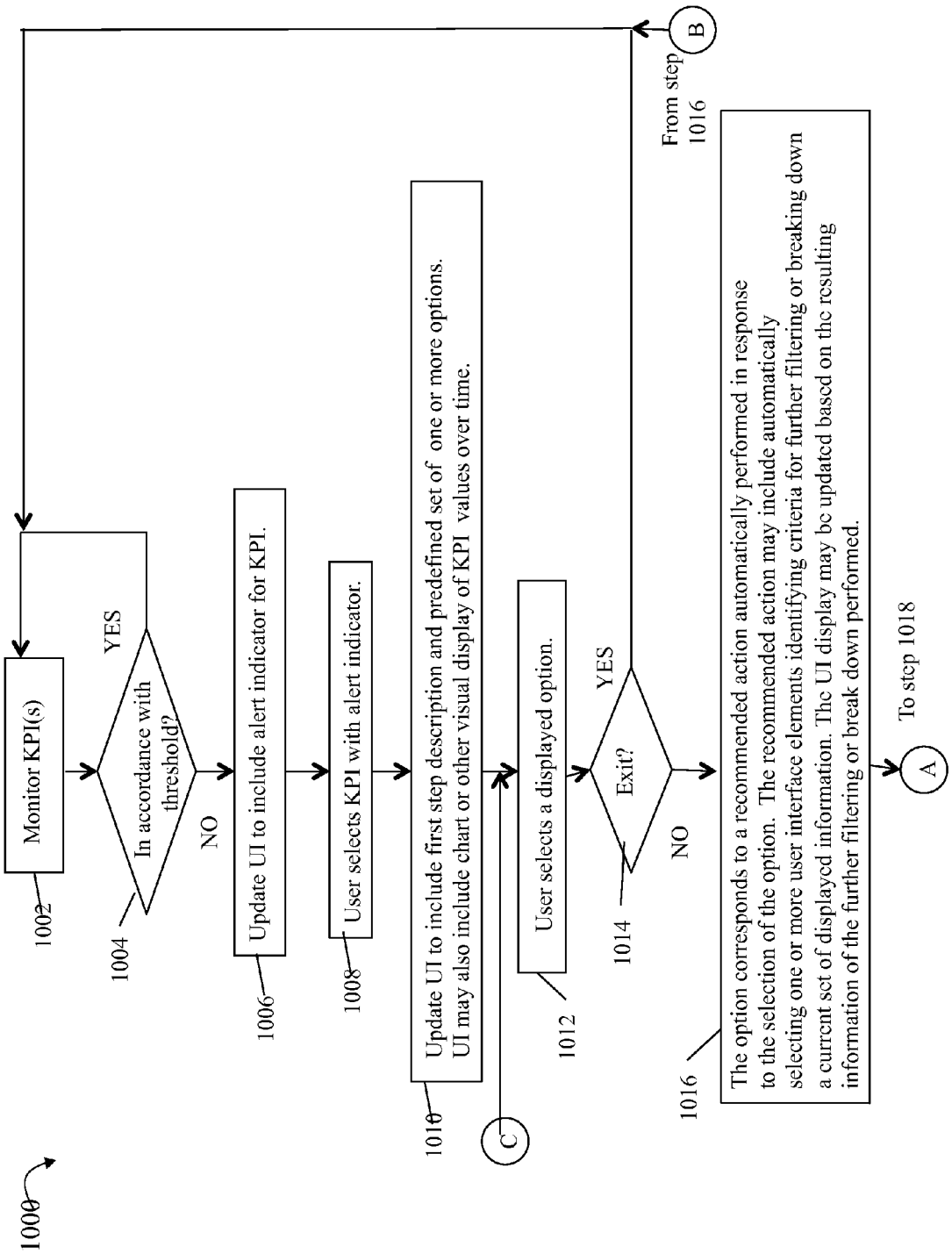
FIGS. 12A and 12B are flowcharts of processing steps that may be performed in an embodiment in accordance with techniques herein.
Figure 12B:
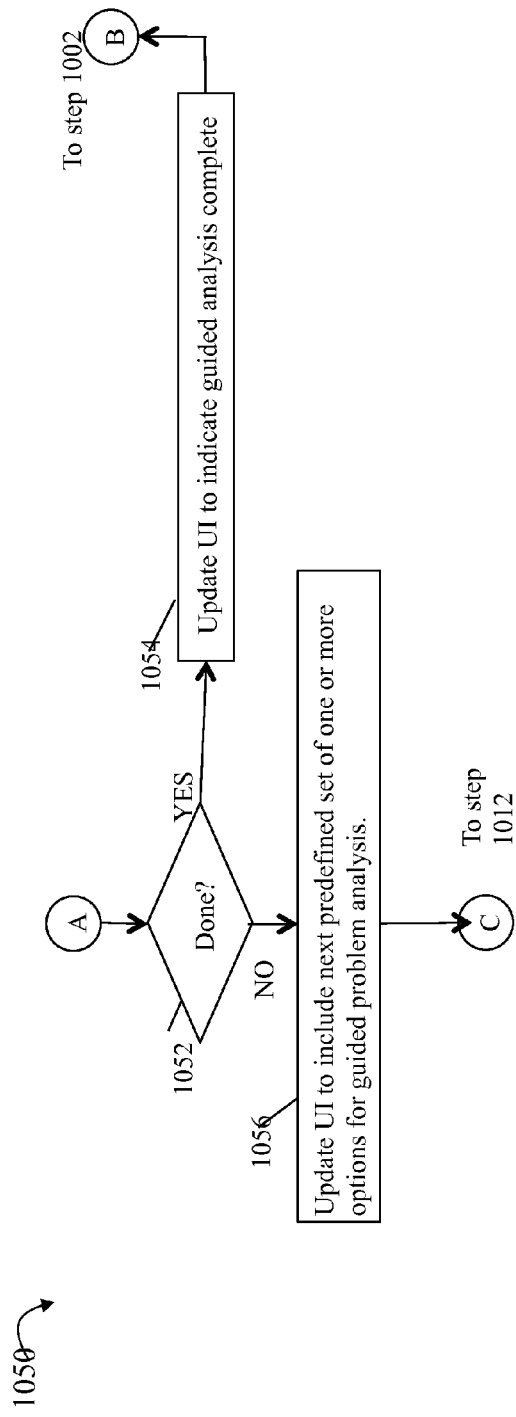

Referring to FIGS. 12A and 12B, shown is a flowchart of processing steps as may be performed in an embodiment in accordance with techniques herein. The flowchart of FIGS. 12A and 12B summarizes processing steps described above. At step 1002, one or more KPIs and associated thresholds may be monitored. At step 1004, a determination is made as to whether current values for the KPIs being monitored are in accordance with specified thresholds. If so, control continues to wait at step 1004 until a KPI being monitored is not in accordance with a specified threshold for the KPI thereby causing processing to proceed to step 1006. In step 1006, the UI may be updated to include an alert indicator for the KPI denoting a performance problem for the monitored KPI. At step 1008, the user may scroll the screen or otherwise have the KPI and associated alert indicator displayed. In step 1010, responsive to detecting the performance problem, the UI display may be updated to include a first step description and the predefined set of one or more options for the first step (e.g., such as illustrated in FIG. 2). The UI may also be updated to include a chart, graph or other visual display of information about the KPI experiencing the detected performance problem. For example, with reference back to FIG. 2, the UI may include a chart or graph 128 of values of the monitored KPI for a recent time period. Thus, the displayed information of 128 may illustrate the change in observed KPI value which triggered the alert and performance problem. In connection with step 1012, the user selects one of the displayed options. As described herein, an embodiment may display options corresponding to recommended actions and additionally may display an option which provides for termination or exit from the guided analysis using the techniques herein. A determine is made at step 1014 as to whether the option is to exit the guided analysis. If step, control proceeds to step 1002. If step 1014 evaluates to no, then control proceeds to step 1016 where it is determined that the option corresponds to a recommended action automatically performed in response to selection of the option. Responsive to selecting the option, the recommended action is performed and may include automatically selecting one or more UI elements to further break down or filter currently displayed information (e.g., further break down or filter the displayed information of 128 regarding the metric such as network latency of FIG. 2 based on selected criteria) thereby producing resulting information. The UI may then be updated with the resulting information. From step 1016, control proceeds to step 10152 where a determination may be made as to whether guided analysis processing is completed. If step 1052, evaluates to yes, control proceeds to step 1054 to accordingly update the UI to indicate the guided performance analysis has completed. From step 1054, control may proceed to step 1002 to continue monitoring. Otherwise if step 1052 evaluates to no, control proceeds to step 1056 to update the UI to include the next predefined set of one or more options for the next step in the guided analysis. From step 1056, control proceeds to 1012 to process the displayed set of options for the current step.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of problem analysis comprising:
   providing notification through a user interface regarding a performance problem of a system; and
   presenting a plurality of user interface displays corresponding to a plurality of steps in connection with performing analysis of the performance problem, wherein each of the plurality of user interface displays includes a predefined set of one or more options, wherein the plurality of steps for the performance problem are represented in a tree including a plurality of levels, wherein each of said plurality of levels corresponds to a different one of the plurality of steps and includes one or more nodes representing the predefined set of one or more options of one of the plurality of user interface displays corresponding to said different one of the plurality of steps.

2. The method of claim 1, wherein at least a first of the options in the predefined set for said each user interface display corresponds to a recommended action automatically performed in response to selecting said first option of the predefined set, and wherein the recommended action automatically performed includes displaying first information resulting from automatically selecting one or more user interface elements identifying one or more criteria used to further filter or partition information included in a current user interface display.

3. The method of claim 1, wherein said presenting includes:
  displaying a first of the plurality of user interface displays including a first predefined set of one or more options in connection with a first of the plurality of steps;
  selecting a first of the options in the first predefined set; and
  responsive to selecting the first option of the first predefined set, displaying a second of the plurality of user interface displays in connection with a second of the plurality of steps, said second user interface display including a second predefined set of one or more options and second information displayed as a result of selecting one or more user interface elements, wherein said selecting one or more user interface elements is performed automatically in connection with selecting the first option of the first set.

4. The method of claim 1, wherein the performance problem is detected when one of a predefined set of performance indicators is not in accordance with a threshold associated with said one predefined performance indicator.

5. The method of claim 4, wherein the system is a data storage system that receives data operations from one or more hosts having applications executing thereon which store data on the data storage system.

6. The method of claim 5, wherein the predefined set of performance indicators includes any one or more of: network latency, CPU utilization, network bandwidth, network I/O processing rate or throughput, application response time, application bandwidth, application I/O processing rate or throughput, application I/O size, application queue length, physical storage device I/O processing rate or throughput, physical storage device bandwidth or data processing rate, physical storage device service time, total physical storage device errors within an elapsed time period, physical storage device response time, disk queue length, protocol response time, protocol bandwidth, protocol I/O processing rate or throughput, shared folder throughput or I/O processing rate, shared folder response time, shared folder bandwidth, shared folder average I/O size, a portion of reads that are read hits thereby being serviced using data from cache rather than reading data from a physical device, and a portion of cache including a most current set of write data not yet destaged to physical storage.

7. The method of claim 1, wherein at least a first of the options in the predefined set for said each user interface display corresponds to a recommended action automatically performed in response to selecting said first option of the predefined set, and wherein the recommended action includes any of displaying a heat map, further filtering information currently displayed in a user interface display, and updating a current user interface display.

8. The method of claim 1, wherein at least a first of the options in the predefined set for said each user interface display corresponds to a recommended action automatically performed in response to selecting said first option of the predefined set, and wherein each of the plurality of user interface displays includes a first area in which the predefined set of one or more options are displayed and a second area, wherein, responsive to selection of the first option from the predefined set, the recommended action is automatically performed which includes automatically updating the second area of said each user interface display thereby producing an updated second area.

9. The method of claim 8, wherein the updated second area includes a display of information equivalent to having selected one or more user interface elements identifying criteria for filtering or partitioning information included in the second area thereby producing resulting information displayed in the updated second area.

10. A method of problem analysis comprising:
  providing notification through a user interface regarding a performance problem of a system; and
  presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option of the predefined set, and wherein said presenting includes:
  displaying a first of the plurality of user interface displays including a first predefined set of one or more options in connection with a first of the plurality of steps;
  selecting a first of the options in the first predefined set; and
  responsive to selecting the first option of the first predefined set, displaying a second of the plurality of user interface displays in connection with a second of the plurality of steps, said second user interface display including a second predefined set of one or more options and second information displayed as a result of selecting one or more user interface elements, wherein said selecting one or more user interface elements is performed automatically in connection with selecting the first option of the first set; and
  wherein if a second option of the first predefined set different from the first option of the first predefined set is selected, a user interface is updated to include an interface display different from the second user interface display whereby the interface display includes a third predefined set of one or more options different than the second predefined set.

11. A method of problem analysis comprising:
  providing notification through a user interface regarding a performance problem of a system; and
  presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option of the predefined set, wherein the plurality of steps for the performance problem are included in a troubleshooting tree, and wherein the troubleshooting tree includes a plurality of levels, each of the plurality of levels including one or more nodes, said troubleshooting tree including a first node corresponding to a first of the plurality of steps, wherein a first set of one or more child nodes of the first node correspond to a first predefined set of one or more options presented in a user interface display, at least one of the options in the first predefined set corresponds to a recommended action automatically performed in response to selecting said one option.

12. The method of claim 11, wherein each of the plurality of steps corresponds to a different one of the plurality of levels in the troubleshooting tree, wherein the different one of the plurality of levels in the tree includes one or more nodes representing one or more predefined options from which a user is allowed to select from a user interface display in connection with performing said each step of a guided user interface for analyzing the performance problem.

13. A system comprising:
a data storage system including a plurality of physical storage devices;
a set of one or more hosts, each of said one or more hosts having one or more applications executing thereon which store data on one or more of the physical storage devices of the data storage system;
a computer readable medium including code stored thereon which, when executed, performs processing for problem analysis, the computer readable medium comprising code that:
provides notification through a user interface regarding a performance problem of the data storage system; and
presents a plurality of user interface displays corresponding to a plurality of steps in connection with performing analysis of the performance problem, wherein the plurality of steps for the performance problem are represented in a tree including a plurality of levels, wherein each of said plurality of levels corresponds to a different one of the plurality of steps and includes one or more nodes representing the predefined set of one or more options of one of the plurality of user interface displays corresponding to said different one of the plurality of steps.

14. A computer readable medium comprising code stored thereon that, when executed, performs a method of problem analysis, the method comprising:
providing notification through a user interface regarding a performance problem of a system; and
presenting a plurality of user interface displays corresponding to a plurality of steps in connection with performing analysis of the performance problem, wherein each of the plurality of user interface displays includes a predefined set of one or more options, wherein the plurality of steps for the performance problem are represented in a tree including a plurality of levels, wherein each of said plurality of levels corresponds to a different one of the plurality of steps and includes one or more nodes representing the predefined set of one or more options of one of the plurality of user interface displays corresponding to said different one of the plurality of steps.

15. The computer readable medium of claim 14, wherein at least a first of the options in the predefined set for said each user interface display corresponds to a recommended action automatically performed in response to selecting said first option of the predefined set, and wherein the recommended action automatically performed includes displaying first information resulting from automatically selecting one or more user interface elements identifying one or more criteria used to further filter or partition information included in a current user interface display.

16. The computer readable medium of claim 14, wherein said presenting includes:
displaying a first of the plurality of user interface displays including a first predefined set of one or more options in connection with a first of the plurality of steps;
selecting a first of the options in the first predefined set; and
responsive to selecting the first option of the first predefined set, displaying a second of the plurality of user interface displays in connection with a second of the plurality of steps, said second user interface display including a second predefined set of one or more options and second information displayed as a result of selecting one or more user interface elements, wherein said selecting one or more user interface elements is performed automatically in connection with selecting the first option of the first set.

17. The computer readable medium of claim 14, wherein the performance problem is detected when one of a predefined set of performance indicators is not in accordance with a threshold associated with said one predefined performance indicator.

18. The computer readable medium of claim 17, wherein the system is a data storage system that receives data operations from one or more hosts having applications executing thereon which store data on the data storage system, and wherein the predefined set of performance indicators includes any one or more of: network latency, CPU utilization, network bandwidth, network I/O processing rate or throughput, application response time, application bandwidth, application I/O processing rate or throughput, application I/O size, application queue length, physical storage device I/O processing rate or throughput, physical storage device bandwidth or data processing rate, physical storage device service time, total physical storage device errors within an elapsed time period, physical storage device response time disk queue length, protocol response time, protocol bandwidth, protocol I/O processing rate or throughput, shared folder throughput or I/O processing rate, shared folder response time, shared folder bandwidth, shared folder average I/O size, a portion of reads that are read hits thereby being serviced using data from cache rather than reading data from a physical device, and a portion of cache including a most current set of write data not yet destaged to physical storage.

19. A computer readable medium comprising code stored thereon that, when executed, performs a method of problem analysis, the method comprising:
providing notification through a user interface regarding a performance problem of a system; and
presenting a plurality of user interface displays corresponding to a plurality of steps in connection with performing analysis of the performance problem, wherein each of the plurality of user interface displays includes a predefined set of one or more options, wherein at least a first of the options in the predefined set corresponds to a recommended action automatically performed in response to selecting said first option of the predefined set, and wherein said presenting includes:
displaying a first of the plurality of user interface displays including a first predefined set of one or more options in connection with a first of the plurality of steps;
selecting a first of the options in the first predefined set; and
responsive to selecting the first option of the first predefined set, displaying a second of the plurality of user interface displays in connection with a second of the plurality of steps, said second user interface display including a second predefined set of one or more options and second information displayed as a result of selecting one or more user interface elements, wherein said selecting one or more user interface elements is performed automatically in connection with selecting the first option of the first set, and wherein if a second option of the first predefined set different from the first option of the first predefined set is selected, a user interface is updated to include an interface display different from the second user interface display whereby the interface display includes a third predefined set of one or more options different than the second predefined set.

* * * * *